United States Patent
Kwon et al.

(10) Patent No.: US 8,837,945 B2
(45) Date of Patent: Sep. 16, 2014

(54) CONNECTION MANAGEMENT SERVER, OLT, ONU/ONT AND THE SYSTEM AND METHOD FOR PROVIDING ETHERNET-BASED PTL-PON

(75) Inventors: Yool Kwon, Daejeon (KR); Hong Ju Kim, Daejeon (KR); Byung Ho Yae, Daejeon (KR); Kyung Gyu Chun, Daejeon (KR); Young Boo Kim, Chungcheongnam-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 287 days.

(21) Appl. No.: 13/330,717

(22) Filed: Dec. 20, 2011

(65) Prior Publication Data
US 2012/0163817 A1 Jun. 28, 2012

(30) Foreign Application Priority Data
Dec. 23, 2010 (KR) ........................ 10-2010-0134065

(51) Int. Cl.
H04J 14/00 (2006.01)
H04L 12/28 (2006.01)
H04Q 11/00 (2006.01)
(52) U.S. Cl.
CPC .... H04L 12/2861 (2013.01); H04Q 2011/0079 (2013.01); H04Q 11/0067 (2013.01)
USPC .................. 398/72; 398/63; 398/66; 398/68; 398/45; 398/48; 398/49; 398/100; 370/352; 370/389; 370/392; 370/468

(58) Field of Classification Search
USPC .......... 398/66, 67, 68, 69, 70, 71, 72, 98, 99, 398/100, 45, 48, 49, 54, 63, 58, 59, 140, 398/141, 158, 159, 33; 370/352, 389, 468, 370/392, 401, 230, 395.53, 395.41
See application file for complete search history.

(56) References Cited

U.S. PATENT DOCUMENTS

| 6,023,467 A | 2/2000 | Abdelhamid et al. |
| 6,570,886 B1 | 5/2003 | De Groote et al. |
| 8,200,088 B2 * | 6/2012 | Sone et al. ...................... 398/72 |
| 2009/0060503 A1 * | 3/2009 | Yin et al. ......................... 398/48 |
| 2011/0150474 A1 * | 6/2011 | Kwon et al. .................... 398/63 |

* cited by examiner

Primary Examiner — Hanh Phan
(74) Attorney, Agent, or Firm — Rabin & Berdo P.C

(57) ABSTRACT

Provided is a passive optical network (PON) providing system of an Ethernet-based packet transport layer (PTL) scheme, including: a connection management server to manage a unified PTL connection overall over the network by establishing a PTL connection between an optical network unit (ONU)/optical network terminal (ONT) of a customer termination of one party and an ONU/ONT of a customer termination of another party, and by applying a PTL-PON scheme to a PON section between the ONU/ONT and an optical line termination (OLT); an OLT to manage a connection of a received packet, and to convert a format of the packet according to a transmission direction of the packet and thereby transmit the packet; and an ONU/ONT becoming an end point of the PTL connection to convert the format of the packet according to the transmission direction of the received packet and to thereby transmit the packet to a customer terminal or the OLT.

14 Claims, 10 Drawing Sheets

FIG 4.

BASE CONNECTION TABLE

| B-DA, B-VID | QoS para. | Service type | Switch 1 Ingress port | Switch 1 Egress port | Switch 2 Ingress port | Switch 2 Egress port | ... |
|---|---|---|---|---|---|---|---|
| | | | | | | | |
| | | | | | | | |

FIG 5.

FIRST CONNECTION TABLE

| B-DA, B-VID | Ingress port | Egress port | LLID, port# | QoS para. | Service type | ... |
|---|---|---|---|---|---|---|
| | | | | | | |
| | | | | | | |

FIG 7.

SECOND CONNECTION TABLE

| B-DA, B-VID | LLID, Port# | QoS para. | Service type | ... |
|---|---|---|---|---|
|  |  |  |  |  |
|  |  |  |  |  |

CONNECTION MANAGEMENT SERVER, OLT, ONU/ONT AND THE SYSTEM AND METHOD FOR PROVIDING ETHERNET-BASED PTL-PON

CROSS-REFERENCE TO RELATED APPLICATIONS

This application claims priority to and the benefit of Korean Patent Application No. 10-2010-0134065 filed in the Korean Intellectual Property Office on Dec. 23, 2010, the entire contents of which are incorporated herein by reference.

TECHNICAL FIELD

The present invention relates to a connection management server, an optical line termination (OLT), an optical network unit (ONU)/optical network terminal (ONT), and a method, and a system for providing a passive optical network (PON) employing a packet transport layer (PTL) technology, and more particularly, to a connection management server, an OLT, an ONU/ONT, and a method and a system for providing a PON of an Ethernet-based PTL scheme for connection management between an ONU or ONT and an OLT.

The present invention is further embodied based on a PON system and method of a PTL scheme that is a filed patent (application number 2009-0128433).

BACKGROUND

In a current communication network, with the increasing importance of the Internet, all the communication services are being packetized. And to stably provide a voice service of a voice over Internet protocol (VoIP) and an image service of an Internet protocol television (IPTV) in a wired/wireless packet network, a technology of a highly reliable packet transport layer (hereinafter, PTL) scheme is being applied.

In order to increase the diversity and the reliability of transport, the PTL scheme enables all the communication services to be performed based on a packet, and accurately transports the packet at a circuit level. So, the above scheme guarantees the transport quality of the packet. But because the above scheme is not applied to an access network, there was a problem in that the above scheme does not guarantee transport quality between customer terminations and is limited to communication between local stations.

An existing passive optical network (hereinafter, PON) scheme includes an Ethernet PON (hereinafter, E-PON) scheme and a gigabit PON (hereinafter, G-PON) scheme. The E-PON scheme is suitable for communication using Ethernet protocol and thus, is applied to an Ethernet network including an Ethernet switch. The G-PON scheme is a scheme enabling an Ethernet and asynchronous transfer mode (ATM) and circuit communication. In general, the above PON schemes are easy to be applied to the Ethernet network and are not suitable for being applied to a PTL network, where connection establishment is needed for guaranteeing the quality.

The detailed description with respect to the above problem will be described through a PTL scheme applied to E-PON.

A packet transmitted from an optical network unit (hereinafter, ONU) or an optical network terminal (hereinafter, ONT) of a customer termination is aggregated at a packet switch of one party via an optical line termination (hereinafter, OLT). The aggregated packets are transported to a packet switch of another party via a packet switch or a router of a metro network and a core network and thereby are transmitted to another customer termination.

In general, in the metro network and the core network, a channel is established by a connection management server and a state of the connection is managed. However, in the access network between an OLT and an ONU/ONT, only a physical link is managed by an E-PON server and a connection of a logical level does not exist.

Accordingly, when an error occurs in transferred information, there was a problem in that even though it is possible to verify whether the error occurred in the metro network and the core network, it is difficult to verify whether the error occurred in the access network.

SUMMARY

The present invention has been made in an effort to provide a connection management server, an optical line termination (OLT), an optical network unit (ONU)/optical network terminal (ONT), and a method, and a system for providing a passive optical network (PON) of an Ethernet-based packet transport layer (PTL) scheme that actively enables connection management from a packet switch to an ONU/ONT of a customer termination when a PTL scheme is applied to a PON.

An exemplary embodiment of the present invention provides a connection management server of a PON providing system of an Ethernet-based PTL scheme, wherein the connection management server manages a unified PTL connection overall over the network by establishing a PTL connection between an ONU/ONT of a customer termination of one party and an ONU/ONT of a customer termination of another party, and by applying a PTL-PON scheme to a PON section between the ONU/ONT and an OLT.

The connection management server may generate a base connection table including information on a packet and download the base connection table to the OLT.

Another exemplary embodiment of the present invention provides an OLT of a PON providing system of an Ethernet-based PLT scheme, wherein the OLT manages a connection of a received packet, and converts a format of the packet according to a transmission direction of the packet and thereby transmits the packet to an ONU/ONT or a packet switch.

The connection management of the packet may be performed by receiving, from a connection management server, a base connection table including information on the packet, by generating a first connection table including identification information of the OLT ports and the ONU/ONT based on the base connection table, by generating a second connection table used by the ONU/ONT based on the first connection table, and by transferring the second connection table to the ONU/ONT.

Also, when a registration and cancellation request for a new connection is received from the connection management server, the OLT may update the first connection table by receiving information on the new connection and may transfer information on the new connection to the ONU/ONT together with the registration and cancellation request for the new connection.

In addition, when the packet is inputted, the OLT may determine whether the input packet is a packet registered to the first connection table. When the input packet is not the registered packet, the OLT may discard the input packet, and when the input packet is the registered packet, the OLT may determine whether a direction of the packet is a first direction towards the ONU/ONT or a second direction towards a packet switch. When the transmission direction of the packet is the first direction, the OLT may perform the conversion by adding, to the packet, a PTL-PON header including a logical link identifier for identifying the ONU/ONT and a port number for identifying the output port of the ONU/ONT. When the transmission direction of the packet is the second direction, the OLT may perform the conversion by removing the PTL-PON header from the packet.

Also, the OLT may include: at least one PON port connected to the ONU/ONT to transmit and receive the packet, and converting the packet to a predetermined format; at least one uplink port connected to a packet switch to transmit and receive the packet, and converting the packet to a predetermined format; a packet switching block connected to the at least one PON port and the at least one uplink port to switch a corresponding packet to a predetermined PON port or an uplink port based on the first connection table; and a control unit to control the packet switching block by using the first connection table.

Yet another exemplary embodiment of the present invention provides an ONU/ONT of a PON providing system of an Ethernet-based PTL scheme, wherein the ONU/ONT becomes an end point of a PTL connection, convert a format of a received packet according to a transmission direction of the received packet, and thereby transmit the converted packet to a customer terminal or an OLT.

The ONU/ONT may receive, from the OLT, a second connection table used by the ONU/ONT, and receive a registration and cancellation request for a new connection and information on the new connection to thereby update the second connection table.

Also, when the packet is inputted, the ONU/ONT may determine whether the input packet is a packet registered to the second connection table. When the input packet is not the registered packet, the ONU/ONT may discard the input packet, and when the input packet is the registered packet, the ONU/ONT may determine whether a direction of the packet is a third direction towards a customer terminal or a fourth direction towards the OLT. When the transmission direction of the packet is the third direction, the ONU/ONT may perform the conversion by removing, from the packet, a PTL-PON header including a logical link identifier for identifying the ONU/ONT and a port number for identifying the output port of the ONU/ONT, and by removing a PTL header including an identifier of a channel belonged by the packet. When the transmission direction of the packet is the fourth direction, the ONU/ONT may perform the conversion by adding the PTL header to the packet and further adding the PTL-PON header to the packet.

In the meantime, the ONU/ONT may include: at least one PON port connected to the OLT to transmit and receive packets; at least one Ethernet port connected to the customer terminal to transmit and receive packets; a packet switching block connected to the at least one PON port and the at least one Ethernet port to switch a corresponding packet to a predetermined PON port or an Ethernet port based on the second connection table; and a control unit to control the packet switching block by using the first connection table.

Still another exemplary embodiment of the present invention provides a PON providing method of an Ethernet-based PTL scheme enabling a connection management server to establish a connection between an ONU/ONT of a customer termination and an OLT, the method including: receiving, from the connection management server, a base connection table including connection information; generating a first connection table including identification information on the ONU/ONT based on the base connection table; and generating a second connection table used by the ONU/ONT based on the first connection table to transfer the second connection table to the ONU/ONT.

The method may further include: determining whether a registration request for a new connection or a cancellation request for an existing connection is received from the connection management server; receiving information on the new or existing connection to update the first connection table when the registration request for a new connection or the cancellation request for an existing connection is received; and requesting the ONU/ONT for registration and cancellation.

Also, the method may further include: determining whether a packet is inputted; determining whether the input packet is a packet registered to the first connection table, when the packet is inputted; discarding the input packet when the input is not the registered packet, and determining whether a direction of the packet is a first direction towards the ONU/ONT or a second direction towards a packet switch, when the input packet is the registered packet; and switching the packet and then converting and outputting the packet by adding, to the packet, a PTL-PON header including a logical link identifier for identifying the ONU/ONT and a port number for identifying the output port of the ONU/ONT when the transmission direction of the packet is the first direction, and converting the packet by removing the PTL-PON header from the packet and then switching and outputting the packet when the transmission direction of the packet is the second direction.

In addition, the method may further include: determining whether a registration request for a new connection or a cancellation request for an existing connection is received from the OLT; and receiving information on the new or existing connection to update the second connection table, when the registration request for a new connection or the cancellation request for an existing connection is received.

In the meantime, the method may further include: determining whether a packet is inputted; determining whether the input packet is a packet registered to the second connection table, when the packet is inputted; discarding the input packet when the input packet is not the registered packet, and determining whether a direction of the packet is a third direction towards a customer terminal or a fourth direction towards the OLT, when the input packet is the registered packet; and switching the packet after removing, from the packet, a PTL-PON header including a logical link identifier for identifying the ONU/ONT and a port number for identifying the output port of the ONU/ONT, when the transmission direction of the packet is the third direction, and then converting the packet by removing, from the switched packet, a PTL header including an identifier for a channel belonged by the packet and outputting the packet, and switching the packet after converting the packet by adding the PTL header to the packet, and outputting the packet after further adding the PTL-PON header to the switched packet, when the transmission direction of the packet is the fourth direction.

Meanwhile, the aforementioned base connection table may include information regarding quality of service (QoS) parameters, a service type, an ingress port of a packet switch, and an egress port of the packet switch by employing a backbone destination address (B-DA) and a backbone virtual local area network identifier (B-VID) as an address with respect to each PTL connection.

The first connection table may include information regarding an ingress port and an egress port of the OLT, an LLID and a port number of the ONU/ONT, a QoS class, and a service type by employing a B-DA and a B-VID as an address with respect to a PON connection of each PTL scheme.

The second connection table may include information regarding an LLID for identifying the ONU/ONT, a port number of the ONU/ONT, a QoS class, and a service type by employing a B-DA and a B-VID as an address with respect to a PON connection of each PTL scheme.

The OLT and the ONU/ONT may perform operation and maintenance (OAM) functions in the access network.

Still yet another exemplary embodiment of the present invention provides a PON providing system of an Ethernet-based PTL scheme, including: a connection management server to manage a unified PTL connection overall over the network by establishing a PTL connection between an ONU/ONT of a customer termination of one party and an ONU/ONT of a customer termination of another party, and by applying a PTL-PON scheme to a PON section between the ONU/ONT and an OLT; an OLT to manage a connection of a received packet, and to convert a format of the packet according to a transmission direction of the packet and to thereby transmit the packet; and an ONU/ONT becoming an end point of the PTL connection to convert the format of the packet according to the transmission direction of the received packet and to thereby transmit the packet to a customer terminal or the OLT.

According to the exemplary embodiments of the present invention, there may be provided a connection management server, an OLT, an ONU/ONT, and a method and a system for providing a PON of an Ethernet-based PTL scheme that enables all of a metro network, a core network, and an access network to be operated and be maintained using a single connection and thereby may transfer highly reliable packets to a customer termination by expanding a technology of a PTL scheme to an ONU/ONT of the customer termination and thereby applying the technology, and establishing and operating a PTL connection even between the ONU/ONT and the OLT.

BRIEF DESCRIPTION OF THE DRAWINGS

FIG. 4 is a table to describe a configuration of a base connection table generated by a connection management server of FIG. 1;

FIG. 5 is a table to describe a configuration of a first connection table generated by an optical line termination (OLT) of FIG. 1;

FIG. 7 is a table to describe a configuration of a second connection table used by an optical network unit (ONU)/optical network terminal (ONT) of FIG. 1;

DETAILED DESCRIPTION

Figure 1:
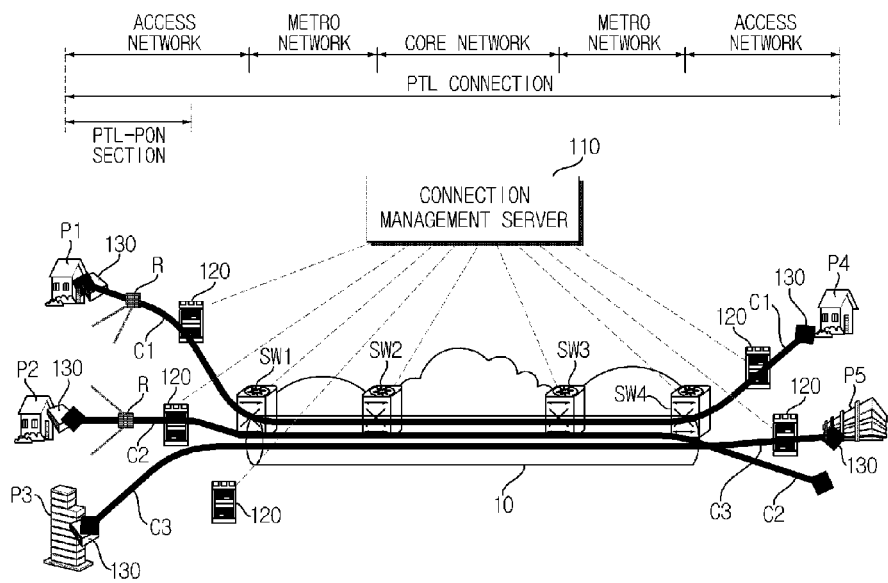
FIG. 1 is a conceptual diagram to describe the entire connection configuration including a passive optical network (PON) providing system of an Ethernet-based packet transport layer (PTL) scheme according to an exemplary embodiment of the present invention.

Hereinafter, exemplary embodiments of the present invention will be described in detail with reference to the accompanying drawings. In this description, when any one element is connected to another element, the corresponding element may be connected directly to another element or with a third element interposed therebetween. First of all, it is to be noted that in giving reference numerals to elements of each drawing, like reference numerals refer to like elements even though like elements are shown in different drawings. The components and operations of the present invention illustrated in the drawings and described with reference to the drawings are described as at least one exemplary embodiment and the spirit and the core components and operation of the present invention are not limited thereto.

FIG. 1 is a conceptual diagram to describe the entire connection configuration including a passive optical network (PON) providing system of a packet transport layer (PTL) scheme according to an exemplary embodiment of the present invention.

The PON providing system of the PTL scheme according to the present embodiment includes optical network units (ONUS)/optical network terminals (ONTs) 130 installed in customer terminations P1, P2, P3, P4, and P5, optical line terminations (OLTs) 120, remote nodes (RNs) R for optical collection/distribution, and a connection management server 110.

Here, when the customer terminations P1, P2, P3, P4, and P5 provide a port to a single subscriber, it refers to ONT 130. When the customer terminations P1, P2, P3, P4, and P5 provide a plurality of ports to a plurality of subscribers, it refers to ONU 130. The present embodiment groups the ONT and the ONU and thereby indicates them as the ONU/ONT 130.

A packet transmitted from the ONU/ONT 130 is aggregated at a packet switch SW1 via the OLT 120. Among aggregated packets, packets to be transported into the same direction are grouped together and then are transmitted to a counter party via a metro network and a core network. In this instance, the connection management server 110 sets a packet transport path as channels C1, C2, and C3, and thereby manages the packet transport path. The connection management server 110 groups channels having the same source and destination into a PTL channel group 10 and thereby manages the channels. Here, the channels C1, C2, and C3 indicate channels connected between the ONUs/ONTs 130 of one side and the ONUs/ONTs 130 of another side. The PTL channel group 10 indicates a connection passage of channels connecting between packet switches SW1, SW2, SW3, and SW4. Each channel or channel group is managed using a PTL connection.

The connection management server 110 manages the connection states of all the sections by setting the channels C1, C2, and C3, and the channel group 10. Here, the channels C1, C2, and C3 set by the connection management server 110 are managed by applying a PTL-PON scheme to the ONU/ONT 130 and the OLT 120 of an access network, by applying a PTL scheme between local stations, or by setting the channel group 10 between the local stations.

With respect to the PTL connection in the access network, the metro network, and the core network, the packet switches SW1, SW2, SW3, and SW4, the OLT 120, and the ONU/ONT 130 perform a connection state monitoring function such as a continuity check, a loopback check, alarm indication signal/remote detection indication (AIS/RDI) state notification, and the like, that is an operation and maintenance (OAM) function defined in a provider backbone bridges-traffic engineering (PBB-TE).

Next, the OLT 120 is described.

The OLT 120 functions to download a base connection table from the aforementioned connection management server 110, to generate and update a first connection table including information capable of identifying a connection of a packet based on the base connection table, to generate a second connection table used by the ONU/ONT 130, and to download the second connection table to the ONU/ONT 130 to be described later.

Figure 2:
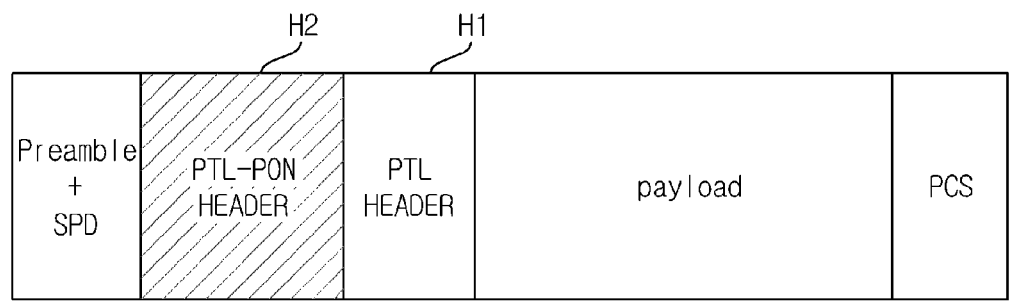
FIG. 2 is a conceptual diagram to describe a format of a packet including a PTL-PON header and a PTL header according to an exemplary embodiment of the present invention.

FIG. 2 is a conceptual diagram to describe a format of a packet including a PTL-PON header and a PTL header according to an exemplary embodiment of the present invention.

Initially, when briefly describing the OLT 120 employing a PTL technology, the OLT 120 converts a format of a packet so that the packet may be applied in a section between the OLT 120 and the ONU/ONT 130.

That is, a format of a PTL-PON packet is used in the section between the OLT 120 and the ONU/ONT 130 and a format of a PTL packet is used in a metro network and a core network. As shown in FIG. 2, the format of the PTL-PON packet indicates a format of additionally adding, to a header (H1 of FIG. 2, hereinafter, a PTL header) including an identifier of a packet such as "B-DA" and "B-VID", a header (H2 of FIG. 2, hereinafter, a PTL-PON header) including a logical link identifier (LLID) for identifying the ONU/ONT 130 and a port number for identifying the output port of the ONU/ONT 130.

Here, the logical link identifier corresponds to an identifier for identifying a plurality of virtual links. The plurality of ONTs/ONUs 130 are connected to a single port of the OLT 120 and in this instance, the logical link identifier is used to identify a corresponding ONU/ONT. Also, the port number indicates a port number of the ONU/ONT 130. For example, when an Internet protocol (IP) telephone and an IPTV are connected to the ONU/ONT 130, the port number is classified into two ports.

Figure 3:
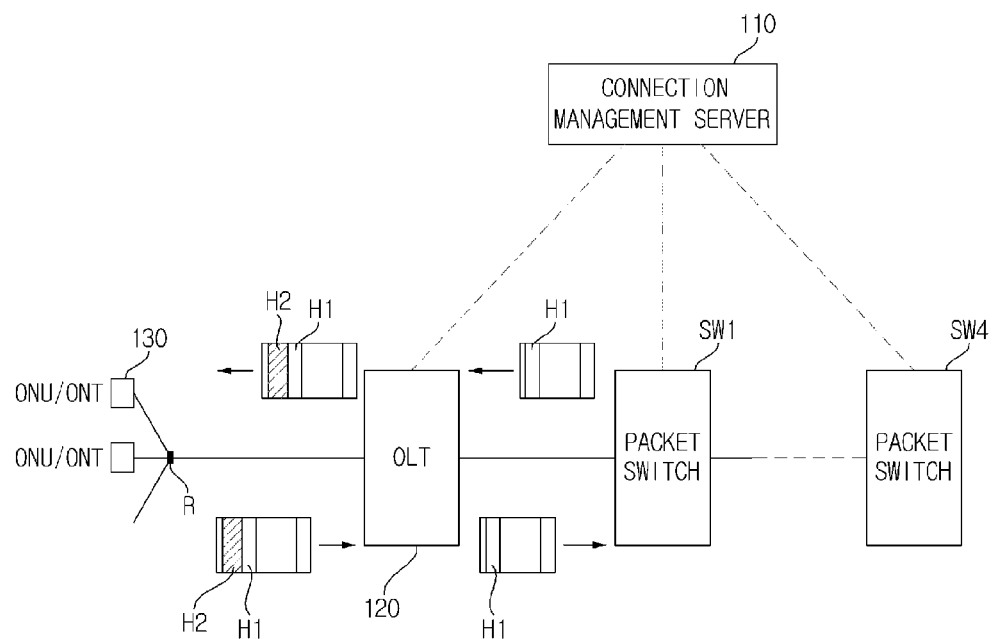
FIG. 3 is a conceptual diagram to describe a process of converting a format of a packet according to an exemplary embodiment of the present invention.

FIG. 3 is a conceptual diagram to describe a process of converting a format of a packet according to an exemplary embodiment of the present invention.

A PTL connection is connected from a user of one side to a user of another side. A packet of a PTL format flows in a section between OLTs and packet switches SW1, SW2, SW3, and SW4. A packet of a PTL-PON format is transported between the OLT 120 and the ONU/ONT 130 to which a PTL-PON scheme is applied.

As described above, in addition to the PLT header H1, the PLT-PON header H2 is further included in the format of the PTL-PON packet. As shown in FIG. 3, when the packet is transported towards the ONU/ONT 130, the OLT 120 generates the PTL-PON packet in which the PTL-PON header H2 is further added to the PTL packet, and transports the PTL-PON packet to the ONU/ONT 130 via an RN (R). When the packet is transported towards the packet switch SW1, the OLT 120 transports, to the packet switch SW1, the PTL packet in which the PTL-PON header H2 is removed from the PTL-PON packet transported from the ONU/ONT 130.

FIG. 4 is a table to describe a configuration of a base connection table generated by the connection management server 110 of FIG. 1.

In the meantime, the configuration of the base connection table generated by the connection management server 110 may be verified through FIG. 4.

As shown in FIG. 4, the base connection table includes a variety of connection information based on an identifier of a channel (connection) belonged by a packet. That is, each parameter of the connection, a QoS parameter, a service type, an ingress port and an egress port of a packet switch SW1, SW2, SW3, and SW4, and the like are stored in the base connection table by employing "B-DA" and "B-VID" as an address with respect to a PTL connection.

Here, B-DA indicates a backbone destination address (hereinafter, B-DA), and B-VID indicates a backbone VLAN identifier (hereinafter, B-VID) and thus, are used as an identifier of the packet.

FIG. 5 is a table to describe a configuration of a first connection table generated by the OLT 120 of FIG. 1. As shown in FIG. 5, the OLT 120 generates the first connection table including information used when the OLT 120 and the ONU/ONT 130 allocate a bandwidth to the connection and switch a packet, and identification information of the ONU/ONT 130, and has the generated first connection table.

The first connection table is generated by the OLT 120 based on a base connection table. The first connection table includes an ingress port and an egress port of the OLT 120, a logical link identifier (LLID) for identifying the ONU/ONT 130, a port number (port #) of the output of the ONU/ONT 130, a QoS class of the PTL connection, a service type, and the like, by employing "B-DA" and "B-VID" as an address with respect to the PTL connection.

Meanwhile, when new connection information is transferred from the connection management server 110, the OLT 120 updates the first connection table. That is, when a cancellation request for an existing PTL connection or a registration request for a new connection is received, the OLT 120 performs a procedure of cancelling or registering a corresponding PTL connection in the first connection table by employing "B-DA" and "B-VID" as an address. In this instance, the OLT 120 requests the ONU/ONT 130 to update the second connection table by downloading new connection information to the ONU/ONT 130.

When a packet is inputted in the OLT 120, the OLT 120 determines whether a corresponding packet is registered to the first connection table. When the corresponding packet is not registered, the OLT 120 discards the corresponding packet. When the corresponding packet is registered, the OLT 120 converts a format of the corresponding packet according to a transmission direction, which is described above.

Figure 6:
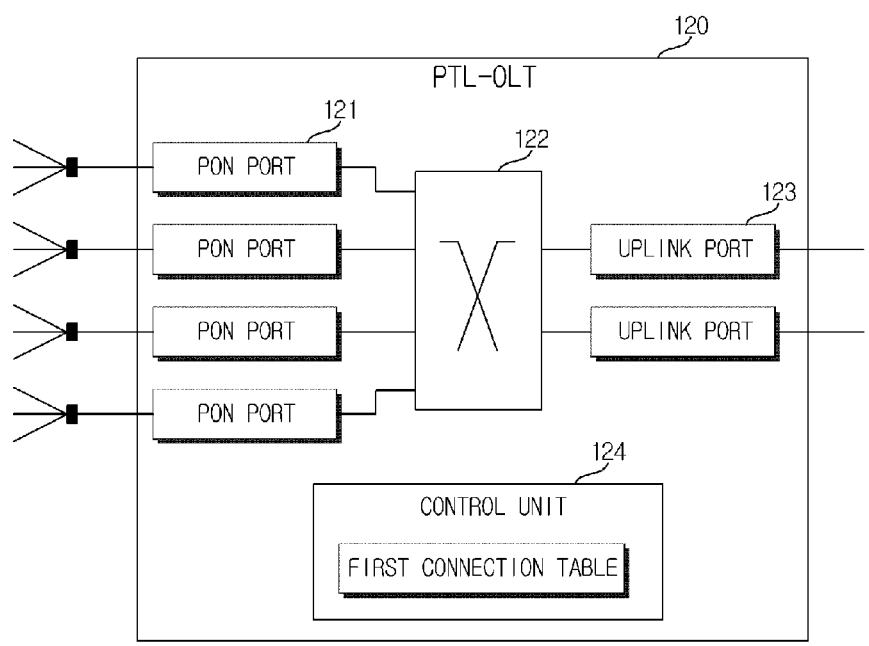
FIG. 6 is a block diagram to describe a configuration of the OLT of FIG. 1.

FIG. 6 is a block diagram to describe a configuration of the OLT 120 of FIG. 1.

As shown in FIG. 6, the OLT 120 includes a plurality of PON ports 121 connected to the ONUs/ONTs 130, uplink ports 123 connected to a packet switch SW1 or SW4, a packet switching block 122, and a control unit 124 including the first connection table.

When a packet is inputted into the uplink port 123, the corresponding packet may be switched to a predetermined PON port 121 by the packet switching block 122 based on information on the first connection table of the control unit 124, and the format of the packet may be converted by further adding a PTL-PON header to the packet and thereby be outputted to the corresponding PON port 121. The transmission direction of the above packet may be determined as a direction towards the ONU/ONT 130.

On the other hand, when a packet is inputted into the PON port 121, the corresponding packet may be switched to a predetermined uplink port 123 by the packet switching block 122 based on information on the first connection table of the control unit 124 and be outputted to the corresponding uplink port 123 in a format converted state in which the PTL-PON header is removed from the packet. The transmission direction of the above packet is determined as a direction towards the packet switches SW1 and SW4.

Meanwhile, the OLT 120 generates the second connection table including information used to allocate a bandwidth to the connection and switch the packet, and thereby downloads the second connection table to the ONU/ONT 130. Accordingly, the second connection table is held by the ONU/ONT 130.

FIG. 7 is a table to describe a configuration of a second connection table used by the ONU/ONT 130 of FIG. 1.

As shown in FIG. 7, the second connection table includes an LLID and a port number (port #) of the ONU/ONT 130, a QoS class, a service type, and the like by employing "B-DA" and "B-VID" as an address.

Next, the ONU/ONT 130 will be described.

The ONU/ONT 130 functions to download and thereby use the second connection table from the OLT 120, and to update the second connection table when receiving new connection information.

Figure 8:
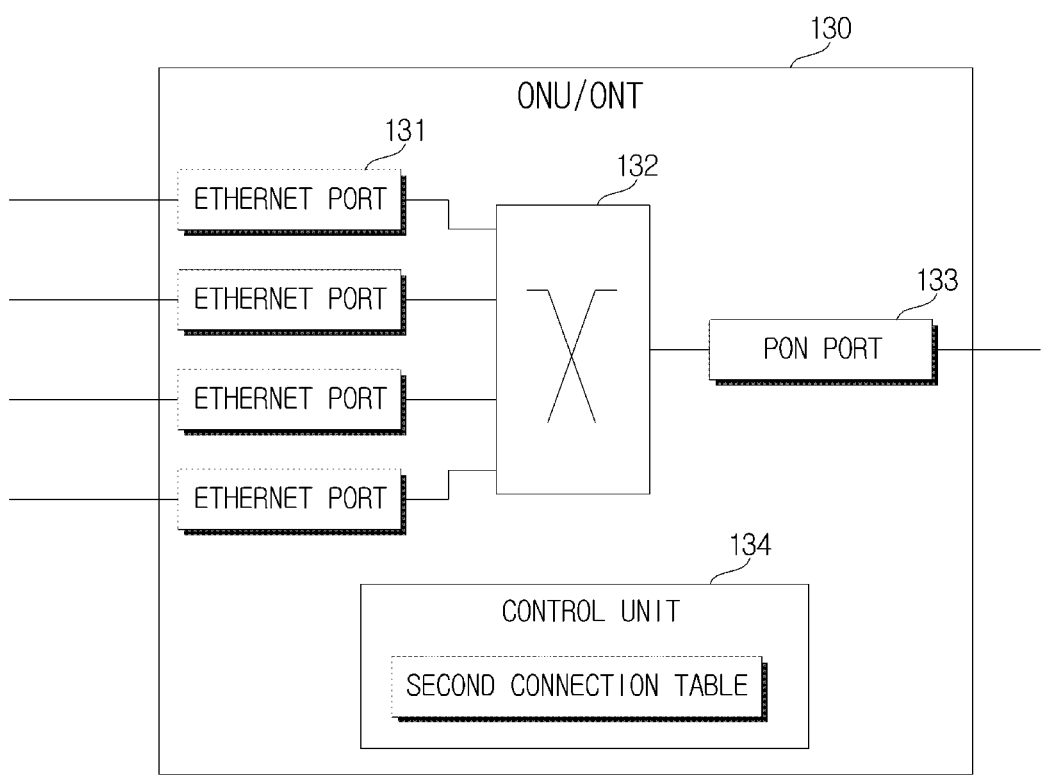
FIG. 8 is a block diagram to describe a configuration of the ONU/ONT of FIG. 1.

FIG. 8 is a block diagram to describe a configuration of the ONU/ONT 130 of FIG. 1.

The ONU/ONT 130 constitutes a PLT-PON system together with the OLT 120, and thereby converts a format of a packet so that a PTL-PON format may be applied to a PTL-PON section.

Hereinafter, the configuration of the ONU/ONT 130 operating based on the second connection table will be described with reference to FIG. 8.

As shown in FIG. 8, the ONU/ONT 130 includes a PON port 133 connected to the OLT 120, Ethernet ports 131 connected to customer terminals, a packet switching block 132, and a control unit 134 including the second connection table.

When a packet is inputted into the PON port 133, the corresponding packet may be switched to a predetermined Ethernet port 131 by the packet switching block 132 based on information on the second connection table of the control unit 134, and be outputted to the corresponding Ethernet port 131 in a format converted state in which the PTL-PON header and the PTL header are removed from the packet. The transmission direction of the above packet is determined as a direction towards the customer terminal.

On the other hand, when a packet is inputted into the Ethernet port 131, the corresponding packet may be switched to a predetermined PON port 133 by the packet switching block 132 by adding the PTL header to the corresponding packet based on information on the second connection table of the control unit 134, the format of the packet may be converted by further adding the PTL-PON header to the packet, and thereby the packet may be outputted to the corresponding PON port 133. The transmission direction of the above packet is determined as a direction towards the OLT 120.

The above ONU/ONT 130 becomes an end point enabling the connection management server 110 to manage the connection using the PTL scheme.

Hereinafter, a PON providing method of a PTL scheme according to embodiments will be described.

Figure 9:
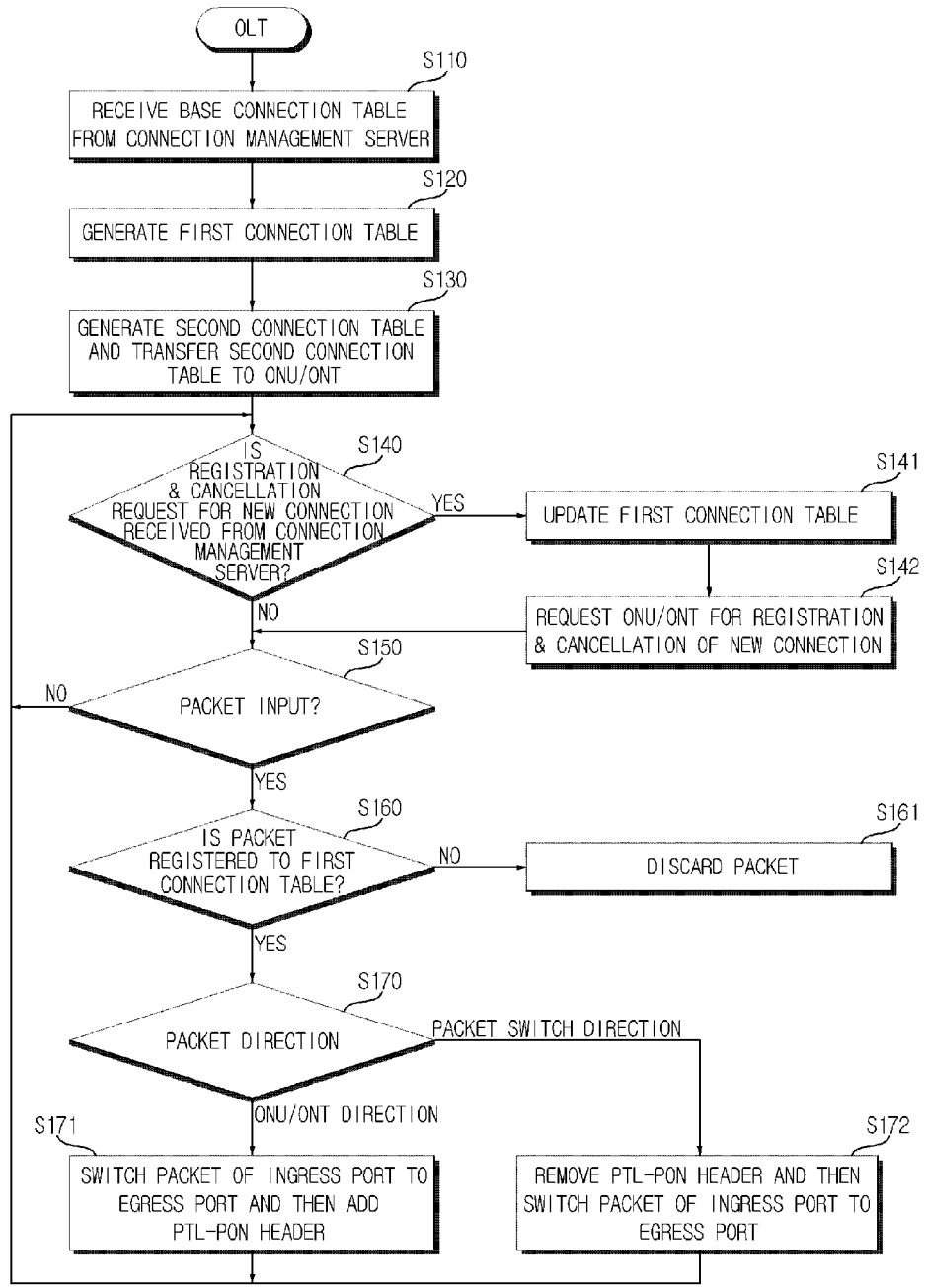
FIG. 9 is a flowchart to describe an operation process of an OLT in an embodiment of a PON providing method of a PTL scheme according to an exemplary embodiment of the present invention.
Figure 10:
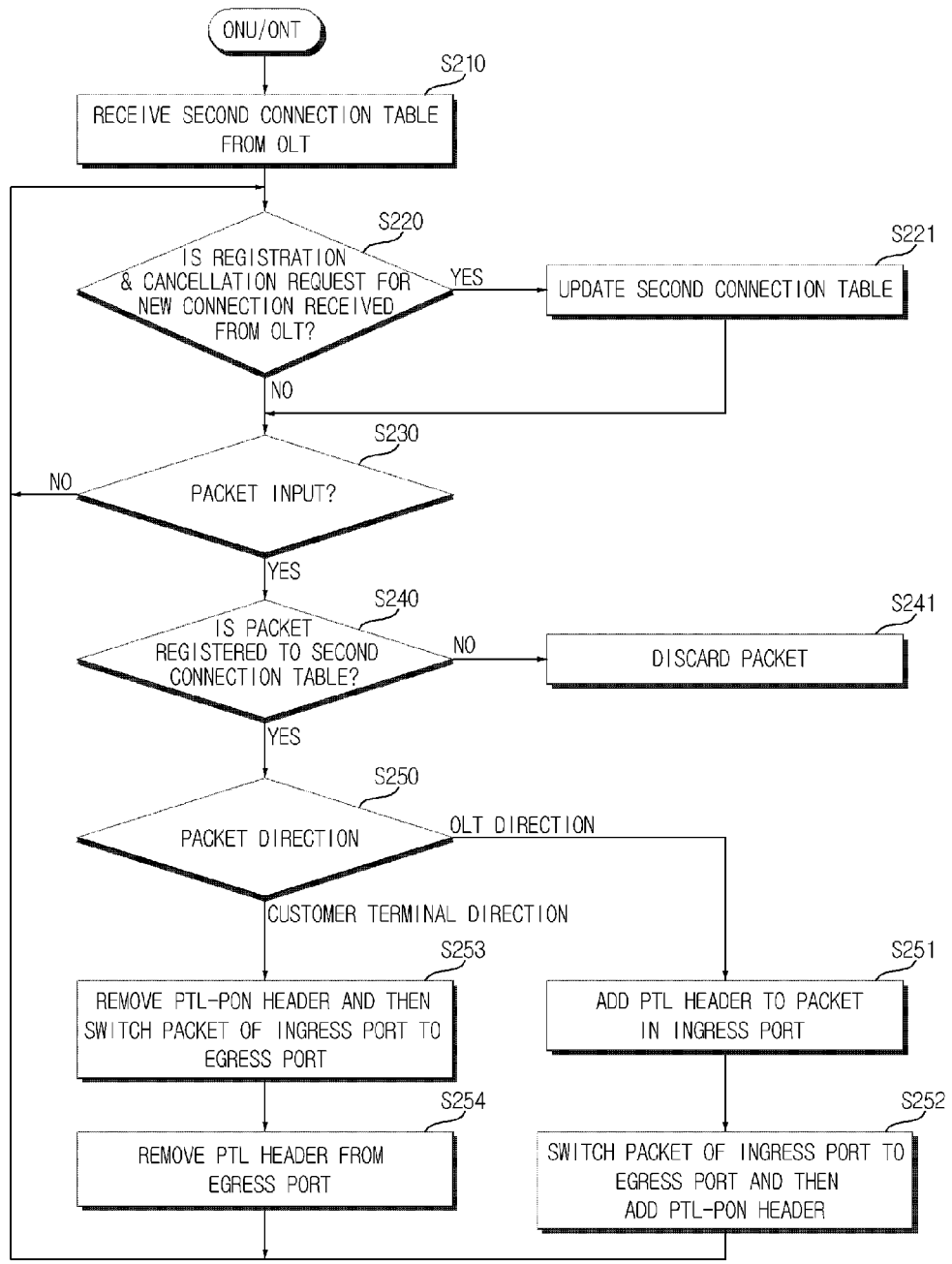
FIG. 10 is a flowchart to describe an operation process of an ONU/ONT in an embodiment of a PON providing method of a PTL scheme according to an exemplary embodiment of the present invention.

FIG. 9 illustrates a flowchart to describe an operation process of an OLT in an embodiment of a PON providing method of a PTL scheme according to an exemplary embodiment of the present invention, and FIG. 10 illustrates a flowchart to describe an operation process of an ONU/ONT in an embodiment of a PON providing method of a PTL scheme according to the present invention.

As shown in FIG. 9, the OLT 120 initially downloads a base connection table from the connection management server 110 during an initialization process (S110).

Next, in operation S120, the OLT 120 generates the first connection table including identification information of the OLT 120 and the ONU/ONT 130 based on the base connection table (S120). The OLT 120 generates a second connection table of a PTL-PON scheme used by the ONU/ONT 130 based on the first connection table and thereby downloads the second connection table to the ONU/ONT 130 (S130).

Next, when the initialization process is terminated, the OLT 120 determines whether new connection information is received from the connection management server 110 as a general operation (S140). Here, as described above, the new connection information relates to cancellation of an existing PTL connection or registration of a new connection. When the new connection information is received, the OLT 120 updates the first connection table (S141).

Updating of the first connection table is performed by performing a procedure of cancelling or registering a corresponding PTL connection in the first connection table by employing "B-DA" and "B-VID" as an address. Next, the OLT 120 downloads the new connection information to the ONU/ONT 130 and thereby requests the ONU/ONT 130 to update the second connection table (S142).

As a next process, the OLT 120 determines whether an input packet exists (S150). When the input packet exists, the OLT 120 determines whether the corresponding packet is a packet registered to the first connection table (S160). When the corresponding packet is not the registered packet, the OLT 120 discards the corresponding packet (S161). When the corresponding packet is the registered packet, the OLT 120 determines a transmission direction of the corresponding packet (S170).

When the transmission direction of the corresponding packet is towards the ONU/ONT 130, the OLT 120 switches the corresponding packet to the PON port 121 and then converts a format of the packet by adding a PTL-PON header to the packet and thereby outputs the packet (S171). On the other hand, when the transmission direction of the packet is towards the packet switches SW1, the OLT 120 converts the format of the packet by removing the PTL-PON header from the packet and switches the packet to the uplink port 123 and thereby outputs the packet (S172).

As shown in FIG. 10, in a self-initialization, the ONU/ONT 130 initially downloads the second connection table from the OLT 120 (S210). When the initialization is terminated, the ONU/ONT 130 determines whether new connection information is received from the OLT 120 (S220). When the new connection information is received, the ONU/ONT 130 updates the second connection table (S221).

Updating of the second connection table is performed by performing a procedure of cancelling or registering a corresponding PTL connection in the second connection table by employing "B-DA" and "B-VID" as an address.

As a next process, the ONU/ONT 130 determines whether an input packet exists (S230). When the input packet exists, the ONU/ONT 130 determines whether the corresponding packet is a packet registered to the second connection table (S240). When the corresponding packet is not the registered packet, the ONU/ONT 130 discards the corresponding packet (S241). When the corresponding packet is the registered packet, the ONU/ONT 130 determines a transmission direction of the corresponding packet (S250).

When the transmission direction of the corresponding packet is towards the OLT 120, the ONU/ONT 130 adds a PTL header to the packet in the egress Ethernet port 131 (S251), and switches the packet to the PON port 133 and then further adds a PTL-PON header to the packet, and thereby converts a format of the packet and outputs the packet (S252). On the other hand, when the transmission direction of the packet is towards a customer terminal, the ONU/ONT 130 removes the PTL-PON header from the packet and then switches the packet to the Ethernet port 131, removes the PTL header and outputs the packet (S254).

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An OLT of a PON providing system of an Ethernet-based PTL scheme, wherein the OLT manages a connection of a received packet, and converts a format of the packet according to a transmission direction of the packet and thereby transmits the packet to an ONU/ONT or a packet switch, and
wherein the connection management of the packet is performed by receiving, from a connection management server, a base connection table including information on the packet, by generating a first connection table including identification information of the OLT ports and the ONU/ONT based on the base connection table, by generating a second connection table used by the ONU/ONT based on the first connection table, and by transferring the second connection table to the ONU/ONT.

2. The OLT of claim 1, wherein when a registration and cancellation request for a new connection is received from the connection management server, the OLT updates the first connection table by receiving information on the new connection and transfers information on the new connection to the ONU/ONT together with the registration and cancellation request for the new connection.

3. The OLT of claim 1, wherein:
when the packet is inputted, the OLT determines whether the input packet is a packet registered to the first connection table, and when the input packet is not the registered packet, the OLT discards the input packet, and when the input packet is the registered packet, the OLT determines whether a direction of the packet is a first direction towards the ONU/ONT or a second direction towards a packet switch,
when the transmission direction of the packet is the first direction, the OLT performs the conversion by adding, to the packet, a PTL-PON header including a logical link identifier for identifying the ONU/ONT and a port number for identifying the output port of the ONU/ONT, and
when the transmission direction of the packet is the second direction, the OLT performs the conversion by removing the PTL-PON header from the packet.

4. The OLT of claim 1, comprising:
at least one PON port connected to the ONU/ONT to transmit and receive the packet, and converting the packet to a predetermined format;
at least one uplink port connected to a packet switch to transmit and receive the packet, and converting the packet to a predetermined format;
a packet switching block connected to the at least one PON port and the at least one uplink port to switch a corresponding packet to a predetermined PON port or an uplink port based on the first connection table; and
a control unit controlling the packet switching block by using the first connection table.

5. An ONU/ONT of a PON providing system of an Ethernet-based PTL scheme, wherein the ONU/ONT becomes an end point of a PTL connection, converts a format of a received packet according to a transmission direction of the received packet, and thereby transmits the converted packet to a customer terminal or an OLT, and
wherein the ONU/ONT receives a second connection table that is generated based on a first connection table including identification information of OLT ports and the ONU/ONT.

6. The ONU/ONT of claim 5, wherein:
the ONU/ONT receives a registration and cancellation request for a new connection and information on the new connection from the OLT, to thereby update the second connection table.

7. The ONU/ONT of claim 5, wherein:
when the packet is inputted, the ONU/ONT determines whether the input packet is a packet registered to the second connection table, and when the input packet is not the registered packet, the ONU/ONT discards the input packet, and when the input packet is the registered packet, the ONU/ONT determines whether a direction of the packet is a third direction towards a customer terminal or a fourth direction towards the OLT, and
when the transmission direction of the packet is the third direction, the ONU/ONT performs the conversion by removing, from the packet, a PTL-PON header including a logical link identifier for identifying the ONU/ONT and a port number for identifying the output port of the ONU/ONT, and by removing a PTL header including an identifier of a channel belonged by the packet, and
when the transmission direction of the packet is the fourth direction, the ONU/ONT performs the conversion by adding the PTL header to the packet and further adding the PTL-PON header to the packet.

8. The ONU/ONT of claim 5, comprising:
at least one PON port connected to the OLT to transmit and receive the packet;
at least one Ethernet port connected to the customer terminal to transmit and receive the packet;
a packet switching block connected to the at least one PON port and the at least one Ethernet port to switch a corresponding packet to a predetermined PON port or an Ethernet port based on the second connection table; and
a control unit to control the packet switching block by using the second connection table.

9. A PON providing method of an Ethernet-based PTL scheme enabling a connection management server to establish a connection between an ONU/ONT of a customer termination and an OLT, the method comprising:
receiving, from the connection management server, a base connection table including connection information;
generating a first connection table including identification information on the ONU/ONT based on the base connection table; and
generating a second connection table used by the ONU/ONT based on the first connection table to transfer the second connection table to the ONU/ONT.

10. The method of claim 9, further comprising:
determining whether a registration request for a new connection or a cancellation request for an existing connection is received from the connection management server;
receiving information on the new or existing connection to update the first connection table when the registration request for a new connection or the cancellation request for an existing connection is received; and
requesting the ONU/ONT for registration and cancellation.

11. The method of claim 9, further comprising:
determining whether a packet is inputted;
determining whether the input packet is a packet registered to the first connection table, when the packet is inputted;
discarding the input packet when the input is not the registered packet, and determining whether a direction of the packet is a first direction towards the ONU/ONT or a second direction towards a packet switch, when the input packet is the registered packet; and
switching the packet and then converting and outputting the packet by adding, to the packet, a PTL-PON header including a logical link identifier for identifying the ONU/ONT and a port identifier for identifying the output port of the ONU/ONT when the transmission direction of the packet is the first direction, and
converting the packet by removing the PTL-PON header from the packet and then switching and outputting the packet when the transmission direction of the packet is the second direction.

12. The method of claim 9, further comprising:
determining whether a registration request for a new connection or a cancellation request for an existing connection is received from the OLT; and
receiving information on the new or existing connection to update the second connection table, when the registration request for a new connection or the cancellation request for an existing connection is received.

13. The method of claim 9, further comprising:
determining whether a packet is inputted;
determining whether the input packet is a packet registered to the second connection table, when the packet is inputted;
discarding the input packet when the input packet is not the registered packet, and determining whether a direction of the packet is a third direction towards a customer terminal or a fourth direction towards the OLT, when the input packet is the registered packet; and
switching the packet after removing, from the packet, a PTL-PON header including a logical link identifier for identifying the ONU/ONT and a port number for identifying the output port of the ONU/ONT, when the transmission direction of the packet is the third direction, and then converting the packet by removing, from the switched packet a PTL header including an identifier for a channel belonged by the packet and outputting the packet, and
switching the packet after converting the packet by adding the PTL header to the packet, and outputting the packet after further adding the PTL-PON header to the switched packet, when the transmission direction of the packet is the fourth direction.

14. A PON providing system of an Ethernet-based PTL scheme, comprising:
a connection management server to manage a unified PTL connection overall over the network by establishing a PTL connection between an ONU/ONT of a customer termination of one party and an ONU/ONT of a customer termination of another party, and by applying a PTL-PON scheme to a PON section between the ONU/ONT and an OLT;
an OLT to manage a connection of a received packet, and to convert a format of the packet according to a transmission direction of the packet to thereby transmit the packet; and
an ONU/ONT becoming an end point of the PTL connection to convert the format of the packet according to the transmission direction of the received packet and to thereby transmit the packet to a customer terminal or the OLT,
wherein the OLT receives a base connection table including information on the packet from a connection management server, generates a first connection table including identification information of OLT ports and the ONU/ONT based on the base connection table, generates a second connection table used by the ONU/ONT based on the first connection table, and transfers the second connection table to the ONU/ONT.

* * * * *